United States Patent
Al-Hazmi et al.

(10) Patent No.: US 12,540,839 B2
(45) Date of Patent: Feb. 3, 2026

(54) SYSTEM FOR MEASURING FLOW WITHIN A PIPELINE

(71) Applicant: Saudi Arabian Oil Company, Dhahran (SA)

(72) Inventors: Shadi Mohammed Al-Hazmi, Hafouf (SA); Mohannad Al-Shahrani, Halouf (SA); Ahmad Al-Ahdal, Hafouf (SA); Hadi Al-Shehri, Hafouf (SA)

(73) Assignee: Saudi Arabian Oil Company, Dhahran (SA)

( * ) Notice: Subject to any disclaimer, the term of this patent is extended or adjusted under 35 U.S.C. 154(b) by 491 days.

(21) Appl. No.: 18/172,393

(22) Filed: Feb. 22, 2023

(65) Prior Publication Data

US 2024/0280388 A1    Aug. 22, 2024

(51) Int. Cl.
| | |
|---|---|
| G01F 1/42 | (2006.01) |
| G01F 1/26 | (2006.01) |
| G01F 1/684 | (2006.01) |
| G01F 15/00 | (2006.01) |
| G01F 15/16 | (2006.01) |

(52) U.S. Cl.
CPC ............. G01F 1/26 (2013.01); G01F 1/42 (2013.01); G01F 1/6842 (2013.01); G01F 15/005 (2013.01); G01F 15/16 (2013.01)

(58) Field of Classification Search
CPC .................................................. G01F 1/34–50
See application file for complete search history.

(56) References Cited

U.S. PATENT DOCUMENTS

| | | |
|---|---|---|
| 7,255,012 B2 | 8/2007 | Hedtke |
| 11,414,950 B2 | 8/2022 | Gallagher et al. |
| 2014/0124061 A1 | 5/2014 | Daniels |
| 2017/0010625 A1* | 1/2017 | Monkowski .............. G01F 1/34 |
| 2019/0204133 A1* | 7/2019 | Somani ................... G01F 1/692 |

(Continued)

OTHER PUBLICATIONS

Egger Pumps "Iris Diaphram Control Valve", www.eggerpumps.com, Sep. 2016.

(Continued)

*Primary Examiner* — Alexander A Mercado
(74) *Attorney, Agent, or Firm* — DINSMORE & SHOHL LLP

(57) ABSTRACT

A system includes a pipeline and a valve mechanism defining an adjustable orifice. An actuator is coupled to the valve mechanism and operable adjust a size of the adjustable orifice. An upstream pressure sensor senses pressure of the fluid and an adjustment controller is communicatively coupled to the actuator and the upstream pressure sensor, wherein the adjustment controller actuates the actuator to adjust the size of the adjustable orifice based on data received from the upstream pressure sensor. A differential pressure sensor measures differential pressure across the adjustable orifice and a temperature sensor senses temperature of the fluid downstream from the adjustable orifice. A calculation controller is communicatively coupled to the adjustment controller, the differential pressure sensor, and the temperature sensor, wherein the calculation controller calculates flow rate of the fluid based on data received from the differential pressure sensor, the temperature sensor, and the adjustment controller.

19 Claims, 3 Drawing Sheets

(56) References Cited

U.S. PATENT DOCUMENTS

| | | | |
|---|---|---|---|
| 2020/0042021 A1* | 2/2020 | Somani | G01F 1/363 |
| 2020/0263513 A1 | 8/2020 | Liezenberg | |
| 2024/0255145 A1* | 8/2024 | Al-Hazmi | F23N 1/002 |
| 2024/0255442 A1* | 8/2024 | Xie | G01F 1/44 |

OTHER PUBLICATIONS

Emerson Automation Solutions, "The Engineer's Guide to DP Flow Measurement", 2020 Edition, 372 pages, 2020.

\* cited by examiner though. For example, the orifice may create a pressure drop, which is related to the flow velocity, and the fluid flow rate through the orifice may be calculated based on the differential pressure measured across the orifice. However at small fluid flow rate, the required minimum pressure drop cannot be achieved by the normal orifice size, thereby necessitating the use of multiple flowmeters for each fluid flow rate. Accordingly, a system that is able to measure flow rate of a fluid stream at several flow conditions is desired.

SYSTEM FOR MEASURING FLOW WITHIN A PIPELINE

TECHNICAL FIELD

Embodiments of the present disclosure generally relate to fluid measurement and, more specifically, to measurement and control of fluid flow in a pipeline.

BACKGROUND

It is often desirable to measure and control fluid flow rate through an orifice of a pipeline, and multiple flowmeters are typically utilized to measure the fluid flow rate therethrough. For example, the orifice may create a pressure drop, which is related to the flow velocity, and the fluid flow rate through the orifice may be calculated based on the differential pressure measured across the orifice. However at small fluid flow rate, the required minimum pressure drop cannot be achieved by the normal orifice size, thereby necessitating the use of multiple flowmeters for each fluid flow rate. Accordingly, a system that is able to measure flow rate of a fluid stream at several flow conditions is desired.

BRIEF SUMMARY

According to the subject matter of the present disclosure, systems for accurately measuring flow rate of a fluid within a pipeline are disclosed.

In accordance with one embodiment of the present disclosure, a system for measuring a flow rate of a fluid may include a pipeline having an upstream end and a downstream end, a fluid source in fluid communication with the upstream end of the pipeline for supplying the fluid to the pipeline, and a flare stack in fluid communication with the downstream end of the pipeline for burning the fluid received from the pipeline. The system may also include a valve mechanism disposed in the pipeline and defining an adjustable orifice that is coaxial with the pipeline, and an actuator coupled to the valve mechanism and operable adjust a size of the adjustable orifice. The system may also include an upstream pressure sensor operable to sense pressure of the fluid in the pipeline at a first upstream location of the pipeline upstream from the adjustable orifice, and an adjustment controller communicatively coupled to the actuator and the upstream pressure sensor, wherein the adjustment controller is configured to actuate the actuator and thereby adjust the size of the adjustable orifice based on pressure data received from the upstream pressure sensor. Further, the system may include a differential pressure sensor operable to measure differential pressure across the adjustable orifice of the valve mechanism, a temperature sensor operable to sense temperature of the fluid in the pipeline at a first downstream location of the pipeline downstream from the adjustable orifice, and a calculation controller. The calculation controller may be communicatively coupled to the adjustment controller, the differential pressure sensor, and the temperature sensor, wherein the calculation controller is configured to calculate the flow rate of the fluid based on differential pressure data received from the differential pressure sensor, temperature data received from the temperature sensor, and size data indicative of the size of the adjustable orifice received from the adjustment controller.

In accordance with another embodiment of the present disclosure, a system for measuring a flow rate of a fluid includes a pipeline through which the fluid flows, a valve mechanism disposed in the pipeline and defining an adjustable orifice that is coaxial with the pipeline, an actuator coupled to the valve mechanism and operable to adjust a size of the adjustable orifice, and an upstream pressure sensor operable to sense pressure of the fluid in the pipeline at a first upstream location of the pipeline upstream from the adjustable orifice. Also, the system may include an adjustment controller communicatively coupled to the actuator and the upstream pressure sensor, wherein the adjustment controller is configured to actuate the actuator and thereby adjust the size of the adjustable orifice based on pressure data received from the upstream pressure sensor, and wherein the adjustment controller is configured to compare the pressure data received from the upstream pressure sensor with predetermined pressure setting data. The system may further include a differential pressure sensor operable to measure differential pressure across the adjustable orifice of the valve mechanism, a temperature sensor operable to sense temperature of the fluid in the pipeline at a first downstream location of the pipeline downstream from the adjustable orifice, and a calculation controller. The calculation controller may be communicatively coupled to the adjustment controller, the differential pressure sensor, and the temperature sensor, wherein the calculation controller is configured to calculate the flow rate of the fluid based on differential pressure data received from the differential pressure sensor, temperature data received from the temperature sensor, and size data indicative of the size of the adjustable orifice received from the adjustment controller.

In accordance with another embodiment of the present disclosure, a system for measuring a flow rate of a fluid includes a pipeline through which the fluid flows, an iris diaphragm valve disposed in the pipeline and defining an adjustable orifice, an actuator coupled to the iris diaphragm valve and operable to adjust a size of the adjustable orifice, an upstream pressure sensor operable to sense pressure of the fluid in the pipeline at a first upstream location of the pipeline upstream from the adjustable orifice, and an adjustment controller. The adjustment controller may be communicatively coupled to the actuator and the upstream pressure sensor, wherein the adjustment controller is configured to actuate the actuator and thereby adjust the size of the adjustable orifice based on pressure data received from the upstream pressure sensor, and compare the pressure data received from the upstream pressure sensor with predetermined pressure setting data, wherein the predetermined pressure setting data comprises a plurality of pressure ranges stored in the adjustment controller, with each of the plurality of pressure ranges corresponding to a particular adjustment to the size of the adjustable orifice. The system may also include a differential pressure sensor operable to measure differential pressure across the adjustable orifice of the iris diaphragm valve, a temperature sensor operable to sense temperature of the fluid in the pipeline at a first downstream location of the pipeline downstream from the adjustable orifice, and a calculation controller. The calculation controller may be communicatively coupled to the adjustment controller, the differential pressure sensor, and the temperature sensor, wherein the calculation controller is configured to calculate the flow rate of the fluid based on differential pressure data received from the differential pressure sensor, temperature data received from the temperature sensor, and size data indicative of the size of the adjustable orifice received from the adjustment controller.

Additional features and advantages of the embodiments described herein will be set forth in the detailed description which follows, and in part will be readily apparent to those skilled in the art from that description or recognized by practicing the embodiments described in this disclosure, including the appended drawings and the detailed description and the claims which are provided infra.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

Reference will now be made in greater detail to various embodiments of the present disclosure, some embodiments of which are illustrated in the accompanying drawings. Whenever possible, the same reference numerals will be used throughout the drawings to refer to the same or similar parts.

DETAILED DESCRIPTION

The present disclosure is directed towards systems for accurately measuring flow rate of a fluid within a pipeline. Conventional systems require multiple flowmeters sampling the same fluid stream in order to provide an accurate estimate of the flow rate at different flow conditions, such as very low flow or very high flow. Embodiments of the present disclosure meet the demand for accurately measuring flow rate. The present embodiments include a valve mechanism, an actuator, an upstream pressure sensor, an adjustment controller, differential pressure sensor, a temperature sensor, and a calculation controller. The valve mechanism defines an adjustable orifice and the actuator is coupled to the valve mechanism and operable adjust a size of the adjustable orifice. The upstream pressure sensor senses pressure of the fluid upstream from the adjustable orifice, and the adjustment controller is communicatively coupled to the actuator and the upstream pressure sensor, and configured to cause the actuator to adjust the size of the adjustable orifice based on data received from the upstream pressure sensor. The differential pressure sensor measures differential pressure across the adjustable orifice and the temperature sensor senses temperature of the fluid downstream from the adjustable orifice. The calculation controller calculates flow rate of the fluid based on data received from the differential pressure sensor, the temperature sensor, and the adjustment controller. Embodiments of the present disclosure are thus able to adjust the size of the adjustable orifice and thereby calculate the flow rate of the fluid at various flow conditions.

Figure 1:
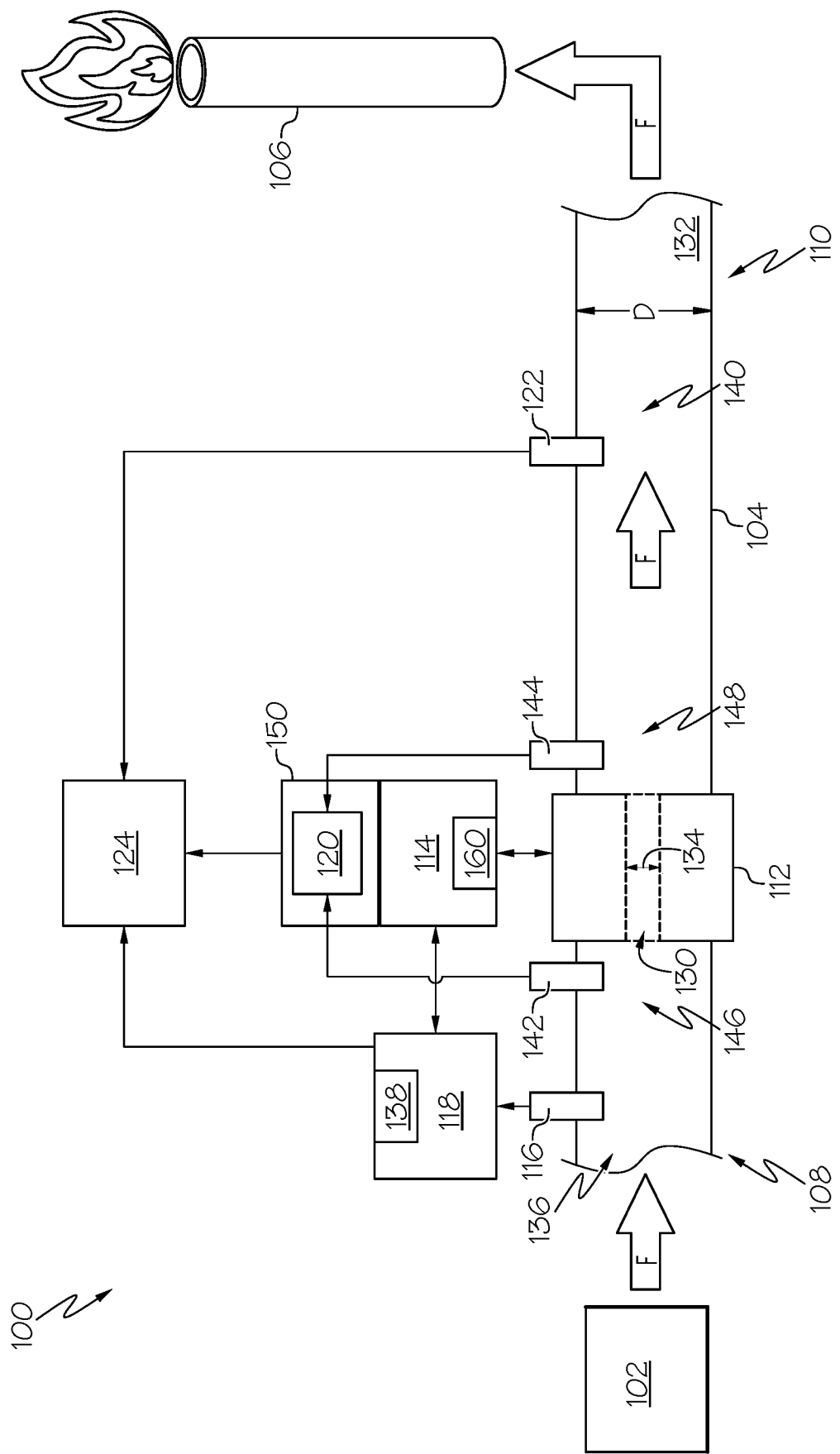
FIG. 1 schematically depicts a cross-sectional view of a system for measuring flow within a segment of a pipeline, according to one or more embodiments of the present disclosure.

FIG. 1 illustrates a system 100 for measuring flow rate of a fluid F, according to embodiments of the present disclosure. The system 100 includes a fluid source 102 from which the fluid F is supplied and a pipeline 104 through which the fluid F flows. In the illustrated embodiment, the system 100 also includes a flare stack 106, such that the system 100 is utilizable in a flaring application; however, the system 100 may be utilized in other applications where measuring flow rate of the fluid F is desirable, for examples, applications that exhibit frequent and variable flow rate, including but not limited to flare header pipelines, oil and gas wells, discharge of motors/compressors, etc. Also, while FIG. 1 illustrates just a segment of the pipeline 104, it will be appreciated that the pipeline 104 includes an upstream end 108 and a downstream end 110. In the illustrated example, the fluid source 102 is in fluid communication with the upstream end 108 of the pipeline 104 and the flare stack 106 is in fluid communication with the downstream end 110 of the pipeline 104. Also, while not fully illustrated, it should be appreciated that there may be various other components interconnecting the pipeline 104 to both the fluid source 102 and the flare stack 106, such as various types of conduits, pipes, valves, processing equipment, storage tanks, etc.

The fluid source 102 is operable for supplying the fluid F to the pipeline 104, and the flare stack 106 is operable to burn the fluid F received from the pipeline 104. The fluid source 102 may include various types of upstream equipment utilized in various types of industrial applications, such as equipment at petroleum refineries, chemical plants, natural gas processing plants, as well as at oil or gas production sites having oil wells, gas wells, offshore oil and gas rigs, and landfills. The flare stack 106 is a combustion device that flares (or burns) the fluid F supplied by the fluid source 102. In some cases, the fluid F supplied by the fluid source 102 may be unwanted or excess process gases (e.g., excess hydrocarbon gases, such as methane, resulting from crude oil extraction or refining), and flaring may be employed to dispose of the fluid F. In other cases, flaring may be employed to dispose of the fluid F that is released by the fluid source 102 as a safety precaution to ensure upstream equipment is not over-pressurized and/or for maintenance purposes. However, it should be appreciated that the flaring of the fluid F may be utilized in other cases without departing from the present disclosure. Moreover, it should be appreciated that aspects of the system 100 may be incorporated into other applications unrelated to flaring, such that the downstream end 110 of the pipeline 104 is connected to a piece of equipment other than the flare stack 106.

The system 100 also includes a valve mechanism 112, an actuator 114, an upstream pressure sensor 116, an adjustment controller 118, a differential pressure sensor 120, a temperature sensor 122, and a calculation controller 124.

The valve mechanism 112 is disposed in the pipeline 104 and defines an adjustable orifice 130 that is coaxial with an inner lumen 132 of the pipeline 104. The actuator 114 is coupled to the valve mechanism 112 and operable to adjust a size 134 of the adjustable orifice 130. In embodiments, the actuator 114 is mechanically coupled to the valve mechanism 112 such that the size 134 of the adjustable orifice 130 may be increased or decreased via actuation of the actuator 114. In embodiments, the adjustable orifice 130 defines a generally circular shaped opening such that the size 134 is a diameter of the adjustable orifice 130 and, in these embodiments, the diameter of the adjustable orifice 130 may controlled (e.g., increased or decreased) via actuation of the actuator 114. In embodiments, the valve mechanism 112 is operable to adjust the adjustable orifice 130 a sufficient amount such that the size 134 is equal to an inner diameter D of the pipeline 104 and, in some embodiments, the valve mechanism 112 is operable to adjust the adjustable orifice 130 a sufficient amount such that the size 134 is equal to zero and thereby effectively closing the pipeline 104.

The upstream pressure sensor 116 is operable to sense pressure of the fluid F in the pipeline 104 at a first upstream location 136 of the pipeline 104 that is upstream from the adjustable orifice 130. In the illustrated embodiment, the upstream pressure sensor 116 is disposed at the first upstream location 136 of the pipeline 104. The upstream pressure sensor 116 may include various types of sensors that are operable to sense pressure of the fluid F, selection of which may depend on the end use application and operating conditions experienced therein.

The adjustment controller 118 is communicatively coupled to the actuator 114 and the upstream pressure sensor 116. Thus, the adjustment controller 118 receives pressure data from the upstream pressure sensor 116 that is indicative of the pressure of the fluid F at the first upstream location 136. The adjustment controller 118 is configured to actuate the actuator 114 and thereby adjust the size 134 of the adjustable orifice 130 based at least partially on the pressure data received from the upstream pressure sensor 116.

In embodiments, the adjustment controller 118 is also configured to determine the size 134 of the adjustable orifice 130 and, in such embodiments, the calculation controller 124 receives size data from the adjustment controller 118, wherein the size data is indicative of the size 134 of the adjustable orifice 130. For example, the adjustment controller 118 may receive data from the actuator 114 that is indicative of the size 134 of the adjustable orifice 130 or that may be correlated to the size 134 of the adjustable orifice 130, and the adjustment controller 118 may utilize this data from the actuator 114 in order to instruct the actuator 114 to open or close the valve mechanism 112 a desired amount such that the size 134 of the adjustable orifice 130 is adjusted as desired. In embodiments, the actuator 114 includes a sensor 160 for generating data indicative of the size 134 of the adjustable orifice 130 (i.e., data indicative to the degree to which the adjustable orifice 130 is open or closed). For example, the sensor 160 may provide an electrical output to the adjustment controller 118 which represents the size 134 of the adjustable orifice 130, between 0% which is fully closed to 100% which is fully open and all points in between. In embodiments, the sensor 160 may be a potentiometer or a Hall effect sensor; however, other sensor may be utilized for sensing the degree of opening or closing of the adjustable orifice 130.

In embodiments, the adjustment controller 118 is configured to compare the pressure data received from the upstream pressure sensor 116 with predetermined pressure setting data and cause adjustment to the size 134 of the adjustable orifice 130 based on the comparison. The predetermined pressure setting data may be based on the type of fluid F utilized and compiled from testing and/or prior use that has established that the size 134 of the adjustable orifice 130 should be a certain size (or range of size) when the fluid F upstream of the adjustable orifice 130 is flowing at a certain pressure value (or ranges of pressure values), in order to achieve desired flow characteristics. The predetermined pressure setting data may be stored in a memory 138 of the adjustment controller 118. In embodiments, the predetermined pressure setting data may include a plurality of pressure ranges, and each of the plurality of pressure ranges may correspond to a particular adjustment to the size 134 of the adjustable orifice 130. For example, the adjustment controller 118 may determine a particular pressure of the fluid F upstream from the adjustable orifice 130 based on the pressure data received from the upstream pressure sensor 116, compare the determined particular pressure of the fluid F to the predetermined pressure setting data, associate the determined particular pressure with a particular range of the plurality of ranges of the predetermined pressure setting data, and then determine whether adjustment to the size 134 the adjustable orifice 130 is needed based on whether the determined particular pressure of the fluid F is within the particular range associated with the size 134 of the adjustable orifice 130. Here, if the adjustment controller 118 determines that the determined particular pressure of the fluid F is within the particular range associated with the size 134 of the adjustable orifice 130, then no further adjustment to the adjustable orifice 130 is needed. However, if the adjustment controller 118 determines that the determined particular pressure of the fluid F is outside of the particular range associated with the size 134 of the adjustable orifice 130, the adjustment controller 118 will instruct the actuator 114 to adjust (i.e., increase or decrease) the size 134 of the adjustable orifice 130 such that the size 134 corresponds to the particular range within which the determined particular pressure of the fluid F is located. In this manner, the system 100 ensures that the size 134 of the adjustable orifice 130 is appropriately sized/adjusted based on the upstream pressure of the fluid F before the fluid F reaches the adjustable orifice 130. In embodiments, the predetermined pressure setting data stored in the memory 138 may be updated over time (e.g., during subsequent uses) such that the particular adjustments to the size 134 of the adjustable orifice 130 are further optimized for the particular pressure of the fluid F sensed by the upstream pressure sensor 116.

The temperature sensor 122 is operable to sense temperature of the fluid F in the pipeline 104 at a first downstream location 140 of the pipeline 104 that is downstream from the adjustable orifice 130. As with the upstream pressure sensor 116, selection of the temperature sensor 122 may depend on the end use application and operating conditions experienced therein. As shown, the temperature sensor 122 is communicatively coupled to the calculation controller 124, such that the calculation controller 124 receives from the temperature sensor 122 temperature data that is indicative of the temperature of the fluid F. As further described below, the calculation controller 124 uses the temperature data to more accurately calculate flow of the fluid F.

The differential pressure sensor 120 (hereinafter, the "DP sensor 120") is operable to measure differential pressure across the adjustable orifice 130 of the valve mechanism 112. The DP sensor 120 includes a first sensing element 142 and a second sensing element 144. In the illustrated embodiment, the first sensing element 142 is positioned at a second upstream location 146 of the pipeline 104 (that is downstream of the first upstream location 136) and the second sensing element 144 is positioned at a second downstream location 148 of the pipeline 104 (that is upstream of the first downstream location 140). Thus, the DP sensor 120 measures differential pressure across the adjustable orifice 130, between the second upstream location 146 and the second downstream location 148 of the pipeline 104, wherein the adjustable orifice 130 is located between the second upstream location 146 and the second downstream location 148 of the pipeline 104. In the illustrated embodiment, the first sensing element 142 is positioned downstream of the upstream pressure sensor 116; however, in other embodiments, the first sensing element 142 may be positioned upstream of the upstream pressure sensor 116. In the illustrated embodiment, the second sensing element 144 is positioned upstream of the temperature sensor 122; however, in other embodiments, the second sensing element 144 may be positioned downstream of the temperature sensor 122.

In embodiments, the DP sensor 120 includes a diaphragm and electrical components contained in a housing 150 of the DP sensor 120, and the first sensing element 142 and the second sensing element 144 are each configured as a port (i.e., an upstream port and a downstream port, respectively) that are each in fluid communication with both the pipeline 104 and the housing 150. In such embodiments, the fluid F may flow from the pipeline 104 into the upstream and downstream ports and into contact with the diaphragm contained in the housing 150, and the diaphragm connected to the electrical components of the DP sensor 120, wherein such electrical components are configured to sense the difference in pressure between the upstream and downstream ports and produce an output signal with reference to a calibrated pressure range. However, the DP sensor 120 may be differently configured without departing from the present disclosure. For example, the first sensing element 142 and the second sensing element 144 may each include an absolute pressure sensor (e.g., a pneumatic sensor and/or a seal-sensor may be utilized when the fluid F is corrosive and/or acidic) communicably coupled to electronics and instrumentation contained in the housing 150 that are configured to measure pressure differential across the adjustable orifice 130.

The calculation controller 124 is communicatively coupled to the adjustment controller 118, the DP sensor 120, and the temperature sensor 122. In the illustrated embodiment, the calculation controller 124 receives differential pressure data from the DP sensor 120 and temperature data from the temperature sensor 122. Also, the calculation controller 124 receives size data from the adjustment controller 118 that is indicative of the size 134 of the adjustable orifice 130. Here, the calculation controller 124 is configured to calculate the flow rate of the fluid F based on the differential pressure data received from the DP sensor 120, the temperature data received from the temperature sensor 122, and the size data received from the adjustment controller 118. The calculation controller 124 uses the temperature data to calculate density of the fluid F flowing through the pipeline 104, and then the calculation controller 124 utilizes density, together with the differential pressure data and the size data, to calculate the flow rate of the fluid F through the pipeline 104.

Figure 2:
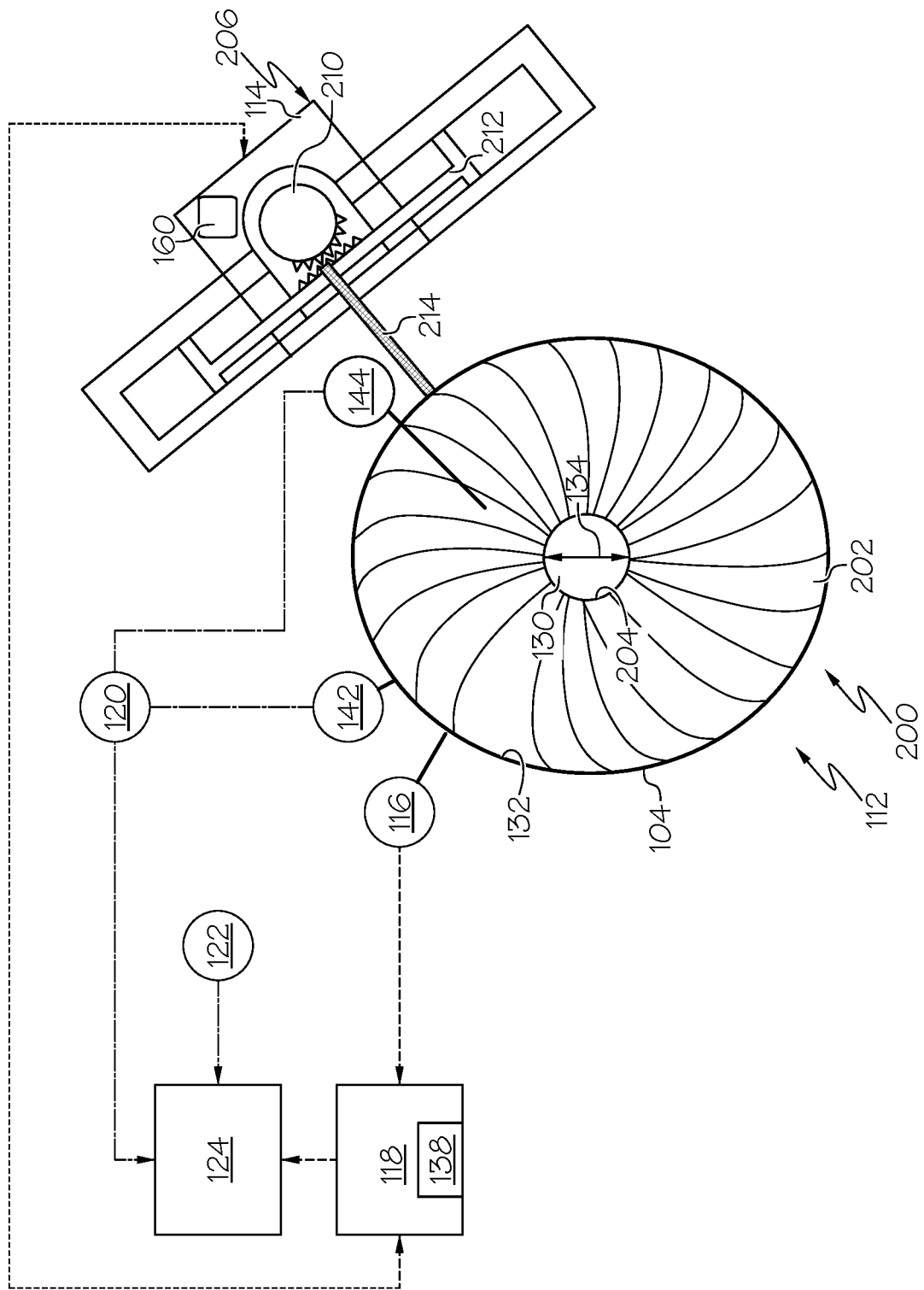
FIG. 2 schematically depicts a cross-section cross-sectional view of a valve mechanism utilizable with the system of FIG. 1.
Figure 3:
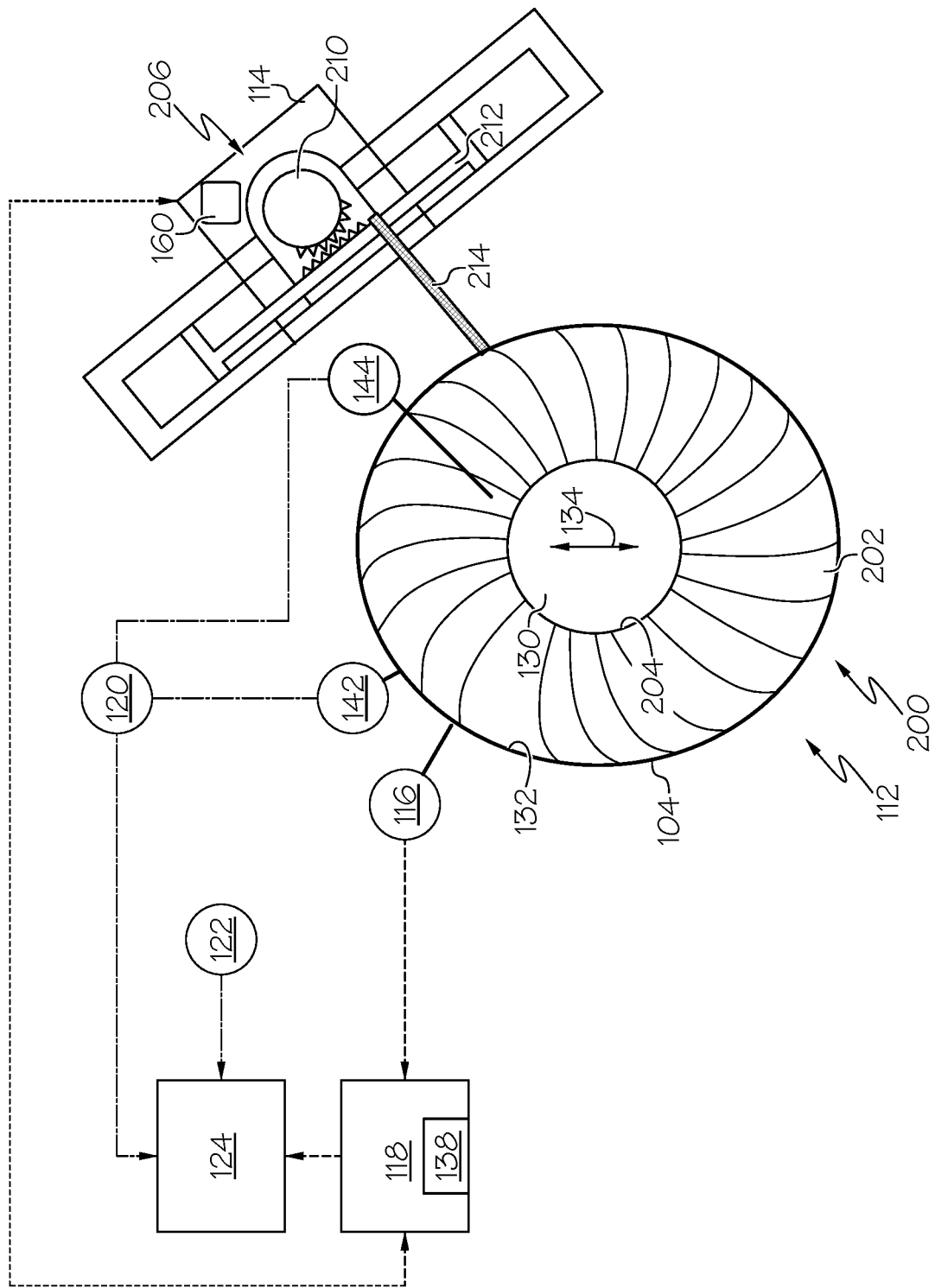
FIG. 3 schematically depicts a cross-section cross-sectional view of the valve mechanism of FIG. 2 having an adjustable orifice adjusted for a relatively higher flow rate as compared to FIG. 2.

FIGS. 2 and 3 illustrate the valve mechanism 112 configured as an iris diaphragm valve 200, according to one or more embodiments. In the illustrated embodiment, the iris diaphragm valve 200 includes a plurality of movable plates 202 that extend into the inner lumen 132 of the pipeline 104. The adjustable orifice 130 is defined by inner edges 204 of the plurality of movable plates 202, and the degree to which the plurality of movable plates 202 extend into the inner lumen 132 controls the amount of fluid F that may flow there-through.

As the plurality of movable plates 202 are moved further into the inner lumen 132 on the pipeline 104, the size 134 of the adjustable orifice 130 defined by the inner edges 204 of the plurality of movable plates 202 becomes smaller and smaller and, ultimately, the size 134 of the adjustable orifice 130 will be zero when the plurality of movable plates 202 are moved to their maximum closed position, thereby fully closing the iris diaphragm valve 200. Conversely, as the plurality of movable plates 202 are moved in opposite directions out of the inner lumen 132, the size 134 of the adjustable orifice 130 defined by edges of the plurality of movable plates 202 becomes larger and larger and, ultimately, the size 134 of the adjustable orifice 130 will be equal to the inner diameter D of the pipeline 104 when the plurality of movable plates 202 are moved to their maximum open position, thereby fully opening the iris diaphragm valve 200. Further, the plurality of movable plates 202 may be moved into various positions in between the fully open and fully closed positions. The size 134 of the adjustable orifice 130 may be changed or adjusted among pre-established closure levels (e.g., 5% or 10% increments) which may be stored in the memory 138, or the change in the size 134 may be continuous such that any closure level between the fully closed and fully open positions may be obtained. In this manner, the iris diaphragm valve 200 is able have flow characteristics that approximate an orifice plate or a restriction plate.

The adjustable orifice 130 of the iris diaphragm valve 200 is characterized by a beta ratio, wherein the beta ratio of the adjustable orifice 130 is equal to the ratio of the size 134 over the inner diameter D of the pipeline 104. In embodiments, the iris diaphragm valve 200 includes mechanical limits that inhibit movement of the plurality of movable plates 202 beyond a certain point, such that the plurality of movable plates 202 would be inhibited from moving into their fully open position and/or into their fully closed position. For example, the iris diaphragm valve 200 may be configured such that the beta ratio of the adjustable orifice 130 is greater than or equal to 0.20 and/or the iris diaphragm valve 200 may be configured such that the beta ratio of the adjustable orifice 130 is less than or equal to 0.70. In some embodiments, the beta ratio of the adjustable orifice 130 is greater than or equal to 0.20 and less than or equal to 0.70. In embodiments incorporating pre-established closure levels, the exact beta ratio of the adjustable orifice 130 for each pre-established closure level could be measured or calculated and then stored in the memory 138.

In the illustrated embodiment, the actuator 114 is a rotary actuator 206. Here, the rotary actuator 206 includes a drive gear 210 and a driven gear 212. The driven gear 212 is connected to an adjustable bar 214, and the adjustable bar 214 is operatively connected to the iris diaphragm valve 200 such that movement of the adjustable bar 214 correspondingly causes movement of the plurality of movable plates 202. In particular, movement of the adjustable bar 214 in a first direction causes the plurality of movable plates 202 to move towards their fully open position and movement of the adjustable bar 214 in a second direction (opposite the first direction) causes the plurality of movable plates 202 to move towards their fully closed position.

The sensor 160 may be integrated within the rotary actuator 206 for generating data indicative of the position of the plurality of movable plates 202 (i.e., the degree to which the plurality of movable plates 202 extend into the inner lumen 132 of the pipeline 104). In embodiments, the sensor 160 provides data indicative of the position of the adjustable bar 214, wherein the adjustment controller 118 is configured to correlate the position of the adjustable bar 214 with the position of the plurality of movable plates 202 (i.e., the degree to which the plurality of movable plates 202 extend into the inner lumen 132 of the pipeline 104).

The rotary actuator 206 is in communication with the adjustment controller 118. The adjustment controller 118 sends drive signals to the rotary actuator 206 which actuate the drive gear 210. The drive gear 210 meshes with the driven gear 212 such that the drive gear 212 is in turn actuated via actuation of the drive gear 210. The adjustable bar 214 is coupled to the driven gear 212 such that actuation of the driven gear 212 in turn moves the adjustable bar 214, thereby moving the plurality of movable plates 202 to enlarge or shrink the size 134 of the adjustable orifice 130.

The size 134 of the adjustable orifice 130 is defined by the degree to which the plurality of movable plates 202 extend into the inner lumen 132 of the pipeline 104, and the size 134 may be associated with a particular pressure (or a particular range of pressures) of the fluid F measured by the upstream pressure sensor 116. When the adjustment controller 118 determines that the fluid F in the first upstream location 136 of the pipeline 104 at is at the particular pressure (or within the particular range of pressures), the adjustment controller 118 may send a signal to the actuator 114 causing the actuator 118 to open or close the plurality of movable plates 202 a certain amount, such that the size 134 of the adjustable orifice 130 is adjusted as desired for that particular pressure (or that particular range of pressures) of the fluid F measured by the upstream pressure sensor 116. For example, the size 134 of the adjustable orifice 130 may be adjusted such that it is sized as shown in FIG. 2 and, when the adjustment controller 118 determines that the pressure of the fluid F sensed by the upstream pressure sensor 116 is higher than a predetermined pressure (or pressure range) associated with the size 134 of the adjustable orifice 130 shown in FIG. 2, the adjustment controller 118 will instruct the actuator 118 to further open the plurality of movable plates 202 and thereby enlarge the size 134, as shown in FIG. 3, such that the adjustable orifice 130 is sized as desired for such larger pressure; however, if the pressure of the fluid F detected by the upstream pressure sensor 116 is determined to be lower than a predetermined pressure (or pressure range) associated with the size 134 of the adjustable orifice 130 shown in FIG. 2, the adjustment controller 118 will instruct the actuator 118 to further close the plurality of movable plates 202 and thereby decrease the size 134 of the adjustable orifice 130. In this manner, embodiments of the present disclosure are operable to accurately calculate flow rate of the fluid F at various flows (i.e., at very low flows and at very high flows) and overcome the challenges of pulsating flow.

One or more aspects of the present disclosure are described here. A first aspect of the present disclosure may include a system for measuring a flow rate of a fluid may include a pipeline having an upstream end and a downstream end, a fluid source in fluid communication with the upstream end of the pipeline for supplying the fluid to the pipeline, and a flare stack in fluid communication with the downstream end of the pipeline for burning the fluid received from the pipeline. The system may also include a valve mechanism disposed in the pipeline and defining an adjustable orifice that is coaxial with the pipeline, and an actuator coupled to the valve mechanism and operable adjust a size of the adjustable orifice. The system may also include an upstream pressure sensor operable to sense pressure of the fluid in the pipeline at a first upstream location of the pipeline upstream from the adjustable orifice, and an adjustment controller communicatively coupled to the actuator and the upstream pressure sensor, wherein the adjustment controller is configured to actuate the actuator and thereby adjust the size of the adjustable orifice based on pressure data received from the upstream pressure sensor. Further, the system may include a differential pressure sensor operable to measure differential pressure across the adjustable orifice of the valve mechanism, a temperature sensor operable to sense temperature of the fluid in the pipeline at a first downstream location of the pipeline downstream from the adjustable orifice, and a calculation controller. The calculation controller may be communicatively coupled to the adjustment controller, the differential pressure sensor, and the temperature sensor, wherein the calculation controller is configured to calculate the flow rate of the fluid based on differential pressure data received from the differential pressure sensor, temperature data received from the temperature sensor, and size data indicative of the size of the adjustable orifice received from the adjustment controller.

A second aspect of the present disclosure may include the first aspect, wherein the valve mechanism is an iris diaphragm valve.

A third aspect of the present disclosure may include the first aspect, wherein the adjustment controller is configured to compare the pressure data received from the upstream pressure sensor with predetermined pressure setting data.

A fourth aspect of the present disclosure may include the third aspect, wherein the predetermined pressure setting data is stored in a memory of the adjustment controller.

A fifth aspect of the present disclosure may include the third aspect, wherein the predetermined pressure setting data comprises a plurality of pressure ranges, and each of the plurality of pressure ranges corresponds to a particular adjustment to the size of the adjustable orifice.

A sixth aspect of the present disclosure may include the first aspect, wherein the differential pressure sensor is operable to measure differential pressure between a second upstream location of the pipeline and a second downstream location of the pipeline, the adjustable orifice is located in between the second upstream location and the second downstream location.

A seventh aspect of the present disclosure may include the sixth aspect, wherein the second upstream location is in between the first upstream location and the adjustable orifice.

An eighth aspect of the present disclosure may include the sixth aspect, wherein the second downstream location is in between the first downstream location and the adjustable orifice.

A ninth aspect of the present disclosure may include the sixth aspect, wherein the differential pressure sensor comprises a first sensing element positioned upstream of the adjustable orifice at the second upstream location and a second sensing element positioned downstream of the adjustable orifice at the second downstream location.

A tenth aspect of the present disclosure may include the first aspect, wherein the adjustment controller is configured to determine the size of the adjustable orifice.

An eleventh aspect of the present disclosure may include the first aspect, wherein the valve mechanism is operable to change the size of the adjustable orifice among pre-established closure levels.

A twelfth aspect of the present disclosure may include the first aspect, wherein the valve mechanism is operable to inhibit movement of the adjustable orifice into both a fully closed position and a fully open position.

A thirteenth aspect of the present disclosure may include the twelfth aspect, wherein a beta ratio of the adjustable orifice is greater than or equal to 0.20 and less than or equal than 0.70, wherein the beta ratio is equal to the ratio of the size of the adjustable orifice to an inner diameter of the pipeline.

A fourteenth aspect of the present disclosure may include a system for measuring a flow rate of a fluid. The system includes a pipeline through which the fluid flows, a valve mechanism disposed in the pipeline and defining an adjustable orifice that is coaxial with the pipeline, an actuator coupled to the valve mechanism and operable to adjust a size of the adjustable orifice, and an upstream pressure sensor operable to sense pressure of the fluid in the pipeline at a first upstream location of the pipeline upstream from the adjustable orifice. Also, the system may include an adjustment controller communicatively coupled to the actuator and the upstream pressure sensor, wherein the adjustment controller is configured to actuate the actuator and thereby adjust the size of the adjustable orifice based on pressure data received from the upstream pressure sensor, and wherein the adjustment controller is configured to compare the pressure data received from the upstream pressure sensor with predetermined pressure setting data. The system may further include a differential pressure sensor operable to measure differential pressure across the adjustable orifice of the valve mechanism, a temperature sensor operable to sense temperature of the fluid in the pipeline at a first downstream location of the pipeline downstream from the adjustable orifice, and a calculation controller. The calculation controller may be communicatively coupled to the adjustment controller, the differential pressure sensor, and the temperature sensor, wherein the calculation controller is configured to calculate the flow rate of the fluid based on differential pressure data received from the differential pressure sensor, temperature data received from the temperature sensor, and size data indicative of the size of the adjustable orifice received from the adjustment controller.

A fifteenth aspect of the present disclosure may include the fourteenth aspect, wherein the valve mechanism is an iris diaphragm valve.

A sixteenth aspect of the present disclosure may include the fourteenth aspect, wherein a beta ratio of the adjustable orifice is greater than or equal to 0.20 and less than or equal than 0.70, wherein the beta ratio is equal to the ratio of the size of the adjustable orifice to an inner diameter of the pipeline.

A seventeenth aspect of the present disclosure may include the fourteenth aspect, wherein the predetermined pressure setting data comprises a plurality of pressure ranges, and each of the plurality of pressure ranges corresponds to a particular adjustment to the size of the adjustable orifice.

An eighteenth aspect of the present disclosure may include the fourteenth aspect, wherein the predetermined pressure setting data is stored in a memory of the adjustment controller.

A nineteenth aspect of the present disclosure may include a system for measuring a flow rate of a fluid. The system includes In accordance with another embodiment of the present disclosure, a system for measuring a flow rate of a fluid includes a pipeline through which the fluid flows, an iris diaphragm valve disposed in the pipeline and defining an adjustable orifice, an actuator coupled to the iris diaphragm valve and operable to adjust a size of the adjustable orifice, an upstream pressure sensor operable to sense pressure of the fluid in the pipeline at a first upstream location of the pipeline upstream from the adjustable orifice, and an adjustment controller. The adjustment controller may be communicatively coupled to the actuator and the upstream pressure sensor, wherein the adjustment controller is configured to actuate the actuator and thereby adjust the size of the adjustable orifice based on pressure data received from the upstream pressure sensor, and compare the pressure data received from the upstream pressure sensor with predetermined pressure setting data, wherein the predetermined pressure setting data comprises a plurality of pressure ranges stored in the adjustment controller, with each of the plurality of pressure ranges corresponding to a particular adjustment to the size of the adjustable orifice. The system may also include a differential pressure sensor operable to measure differential pressure across the adjustable orifice of the iris diaphragm valve, a temperature sensor operable to sense temperature of the fluid in the pipeline at a first downstream location of the pipeline downstream from the adjustable orifice, and a calculation controller. The calculation controller may be communicatively coupled to the adjustment controller, the differential pressure sensor, and the temperature sensor, wherein the calculation controller is configured to calculate the flow rate of the fluid based on differential pressure data received from the differential pressure sensor, temperature data received from the temperature sensor, and size data indicative of the size of the adjustable orifice received from the adjustment controller.

A twentieth aspect of the present disclosure may include the nineteenth aspect, wherein the differential pressure sensor is operable to measure differential pressure between a second upstream location of the pipeline and a second downstream location of the pipeline, the adjustable orifice is located in between the second upstream location and the second downstream location, the second upstream location is in between the first upstream location and the adjustable orifice, and the second downstream location is in between the first downstream location and the adjustable orifice.

It is also noted that recitations herein of "at least one" component, element, etc., should not be used to create an inference that the alternative use of the articles "a" or "an" should be limited to a single component, element, etc. For example, the use of "at least one fluid control valve" should not be interpreted to mean that the wellhead can only include one fluid control valve.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A system for measuring a flow rate of a fluid, the system comprising:
   a pipeline through which the fluid flows;
   a valve mechanism disposed in the pipeline and defining an adjustable orifice that is coaxial with the pipeline;

an actuator coupled to the valve mechanism and operable to adjust a size of the adjustable orifice;

an upstream pressure sensor operable to sense pressure of the fluid in the pipeline at a first upstream location of the pipeline upstream from the adjustable orifice;

an adjustment controller communicatively coupled to the actuator and the upstream pressure sensor, wherein the adjustment controller is configured to actuate the actuator and thereby adjust the size of the adjustable orifice based on pressure data received from the upstream pressure sensor, wherein the adjustment controller is configured to compare the pressure data received from the upstream pressure sensor with predetermined pressure setting data;

a differential pressure sensor operable to measure differential pressure across the adjustable orifice of the valve mechanism;

a temperature sensor operable to sense temperature of the fluid in the pipeline at a first downstream location of the pipeline downstream from the adjustable orifice; and a calculation controller communicatively coupled to the adjustment controller, the differential pressure sensor, and the temperature sensor, wherein the calculation controller is configured to calculate the flow rate of the fluid based on differential pressure data received from the differential pressure sensor, temperature data received from the temperature sensor, and size data indicative of the size of the adjustable orifice received from the adjustment controller.

2. The system of claim 1, further comprising:

a fluid source in fluid communication with an upstream end of the pipeline for supplying the fluid to the pipeline, the pipeline comprising the upstream end and a downstream end; and a flare stack in fluid communication with the downstream end of the pipeline for burning the fluid received from the pipeline.

3. The system of claim 2, wherein the valve mechanism is an iris diaphragm valve.

4. The system of claim 2, wherein the differential pressure sensor is operable to measure differential pressure between a second upstream location of the pipeline and a second downstream location of the pipeline, the adjustable orifice is located in between the second upstream location and the second downstream location.

5. The system of claim 4, wherein the second upstream location is in between the first upstream location and the adjustable orifice.

6. The system of claim 4, wherein the second downstream location is in between the first downstream location and the adjustable orifice.

7. The system of claim 4, wherein the differential pressure sensor comprises a first sensing element positioned upstream of the adjustable orifice at the second upstream location and a second sensing element positioned downstream of the adjustable orifice at the second downstream location.

8. The system of claim 2, wherein the adjustment controller is configured to determine the size of the adjustable orifice.

9. The system of claim 2, wherein the valve mechanism is operable to change the size of the adjustable orifice among pre-established closure levels.

10. The system of claim 2, wherein the valve mechanism is operable to inhibit movement of the adjustable orifice into both a fully closed position and a fully open position.

11. The system of claim 10, wherein a beta ratio of the adjustable orifice is greater than or equal to 0.20 and less than or equal than 0.70, wherein the beta ratio is equal to the ratio of the size of the adjustable orifice to an inner diameter of the pipeline.

12. The system of claim 1, wherein the predetermined pressure setting data is stored in a memory of the adjustment controller.

13. The system of claim 1, wherein the predetermined pressure setting data comprises a plurality of pressure ranges, and each of the plurality of pressure ranges corresponds to a particular adjustment to the size of the adjustable orifice.

14. The system of claim 1, wherein the valve mechanism is an iris diaphragm valve.

15. The system of claim 1, wherein a beta ratio of the adjustable orifice is greater than or equal to 0.20 and less than or equal than 0.70, wherein the beta ratio is equal to the ratio of the size of the adjustable orifice to an inner diameter of the pipeline.

16. The system of claim 1, wherein the predetermined pressure setting data comprises a plurality of pressure ranges, and each of the plurality of pressure ranges corresponds to a particular adjustment to the size of the adjustable orifice.

17. The system of claim 1, wherein the predetermined pressure setting data is stored in a memory of the adjustment controller.

18. The system of claim 1, wherein:

the valve mechanism is an iris diaphragm valve; and the predetermined pressure setting data comprises a plurality of pressure ranges stored in the adjustment controller, with each of the plurality of pressure ranges corresponding to a particular adjustment to the size of the adjustable orifice.

19. The system of claim 18, wherein the differential pressure sensor is operable to measure differential pressure between a second upstream location of the pipeline and a second downstream location of the pipeline, the adjustable orifice is located in between the second upstream location and the second downstream location, the second upstream location is in between the first upstream location and the adjustable orifice, and the second downstream location is in between the first downstream location and the adjustable orifice.

* * * * *